United States Patent [19]

Kumpf et al.

[11] 4,403,340
[45] Sep. 6, 1983

[54] OCR MATRIX EXTRACTOR

[75] Inventors: Richard E. Kumpf, San Jose; William R. Smith, Mountain View, both of Calif.

[73] Assignee: Caere Corporation, Los Gatos, Calif.

[21] Appl. No.: 223,002

[22] Filed: Jan. 6, 1981

[51] Int. Cl.³ .............................................. G06K 9/36
[52] U.S. Cl. .......................................... 382/48; 382/62
[58] Field of Search ............. 340/146.3 H, 146.3 AC, 340/146.3 MA; 382/45, 48, 62, 63; 358/260, 261; 235/480

[56] References Cited

U.S. PATENT DOCUMENTS

| | | | |
|---|---|---|---|
| 3,295,105 | 12/1966 | Gray et al. | 382/48 |
| 3,506,807 | 4/1970 | Malaby | 382/45 |
| 3,539,993 | 11/1970 | Hardin et al. | 382/48 |
| 3,613,080 | 10/1971 | Angeloni et al. | 340/146.3 AC |
| 3,613,081 | 10/1971 | Morimoto | 340/146.3 H |
| 3,629,827 | 12/1971 | Johnston | 340/146.3 H |
| 3,699,536 | 10/1972 | Roberts | 340/146.3 H |
| 3,717,848 | 2/1973 | Irvin et al. | 382/48 |
| 3,761,876 | 9/1973 | Flaherty et al. | 340/146.3 MA |
| 4,091,424 | 5/1978 | Widergren | 358/261 |
| 4,156,231 | 5/1979 | Edamatsu et al. | 340/146.3 H |
| 4,206,442 | 6/1980 | Miyazaki et al. | 340/146.3 H |
| 4,295,121 | 10/1981 | Enser et al. | 340/146.3 H |

*Primary Examiner*—Leo H. Boudreau
*Attorney, Agent, or Firm*—Blakely, Sokoloff, Taylor & Zafman

[57] ABSTRACT

A matrix extractor is described which is particularly useful for extracting data from a memory which contains representations of optically scanned characters. The method and apparatus of the present invention permits the isolation of packets of data in the memory and the determination of the location of these packets. Data representing the packets is then extracted from the memory for character recognition. The isolation of packets in memory greatly reduces the amount of data which must be processed by the recognition processor and provides much more reliable recognition.

15 Claims, 14 Drawing Figures

| | LEFT 1 | 2 | 3 | 4 | 5 | 6 | 7 | 8 RIGHT |
|---|---|---|---|---|---|---|---|---|
| REMAINDER 0 | 0 | 0 | 0 | 0 | 0 | 0 | 0 | 0 |
| 1 | 0 | 0 | 0 | 1 | 0 | 0 | 0 | 0 |
| 2 | 0 | 1 | 0 | 0 | 0 | 1 | 0 | 0 |
| 3 | 0 | 1 | 0 | 1 | 0 | 1 | 0 | 0 |
| 4 | 1 | 0 | 1 | 0 | 1 | 0 | 1 | 0 |
| 5 | 1 | 0 | 1 | 0 | 1 | 0 | 1 | 1 |
| 6 | 1 | 0 | 1 | 1 | 1 | 0 | 1 | 1 |
| 7 | 1 | 1 | 1 | 1 | 0 | 1 | 1 | 1 |

Fig. 8 RESET SEARCH & SEARCH INTERRUPT

Fig. 9

BACKSCAN & BACKSCAN INTERRUPT

Fig. 10 COORDINATE LOCATION & OUTPUT

Fig. 11
DATA COMPRESSION & OUTPUT

OCR MATRIX EXTRACTOR

BACKGROUND OF THE INVENTION

1. Field of the Invention

The invention relates to the field of data isolation preparatory to data classification, particularly for optical character recognition (OCR).

2. Prior Art

Numerous commercial systems are available for recognizing characters, and the like. In one class of these systems, alphanumeric characters are optically scanned and the resultant information is processed so as to recognize the characters. In some of these systems, a hand-held wand or reader is manually moved across printed characters and the characters are optically scanned by the reader.

The recognition of characters scanned by hand-held readers is particularly difficult since precise registry of the characters relative to the optical system of the scanner is not possible because of the manual movement of the reader. For example, there is a tendency for the operator to cause the reader to drift above and below the characters, particularly when "reading" a long line.

In processing the data received from such readers, the location of the characters within the field of view of the reader is not known, making it more difficult to recognize characters. In some cases, considerable fields of data which do not contain characters are processed. In other cases, complicated circuitry is used to find locations of the characters.

As will be seen, the present invention teaches a matrix extractor which isolates from scanned fields areas having characters, or the like. Only data within these areas is extracted for processing. This, of course, reduces the total amount of data required for processing and simplifies the recognition process.

OCR systems employing hand-held readers are described in U.S. Pat. Nos. 4,075,605 and 4,180,799.

SUMMARY OF THE INVENTION

In the presently preferred embodiment, characters are scanned with a hand-held reader and the data thus obtained is stored in memory. The present invention teaches a method and apparatus for isolating packets of data in the memory which contain characters, or the like. The memory is scanned in a first direction while tracking the tops and bottoms of packets to identify the end of a packet. The end or death of the packet permits determination of the location of the packet end in this first direction. Then the memory is scanned in the opposite direction to the first direction, tracking the top and bottom of the identified packet. When the end of the packet is detected in this opposite direction, the extent of the packet in this second direction is then known. Also, by examining the top and bottom of the packet, the vertical extent of the packet is determined. A rectangle is thus defined about the packet since the vertical and horizontal extents of the packet are known and also the location of the rectangle is known. The data in the memory within the rectangle is then extracted and processed to identify the character, or the like, contained within the rectangle.

In effect, the invented method and apparatus locates a perimeter which comprises contiguous contrasting elements (pixels) with respect to the background medium, identifies the extent of the perimeter and then extracts the data contained within the located perimeter. This eliminates the need to process the contents of the entire memory matrix, and more importantly, assures that the data relating to a single character is extracted at one time period since only a single character will be present in each of the perimeters.

BRIEF DESCRIPTION OF THE DRAWINGS

FIG. 4 is a series of diagrams used to describe the data obtained from a memory during the search mode and back-scan mode of the present invention.

FIG. 12 includes diagrams used to describe the state diagram of FIG. 8 and the operation of the matrix extractor of FIG. 6 during the search mode.

DETAILED DESCRIPTION OF THE INVENTION

A matrix extractor is described which is particularly suitable for use in an optical character recognition (OCR) system which employs a hand-held reader. The invented extractor and method of operation of the extractor permits the extraction of data packets containing single characters or other symbols. In the following description, numerous specific details are set forth such as specific memory size, specific control bits, etc. in order to provide a thorough understanding of the present invention. However, it will be obvious to one skilled in the art that the described method and apparatus may be practiced without these specific details. In other instances, well-known circuits are shown in block diagram form in order not to obscure the present invention in unnecessary detail.

Figure 1:
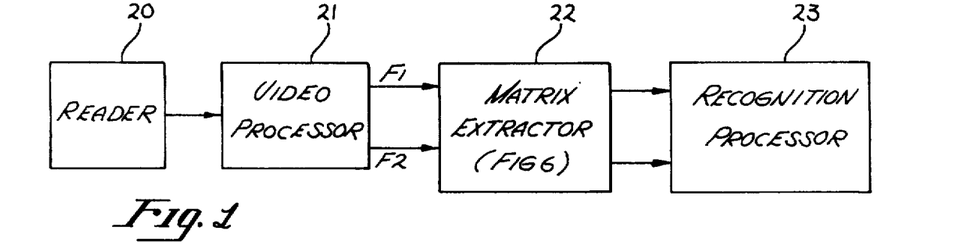
FIG. 1 is a block diagram illustrating the major components in an in an optical character recognition system and the placement of the invented matrix extractor within that system.

Referring first to FIG. 1, the overall OCR system includes a data acquisition means such as a hand-held reader 20. In the presently preferred embodiment, the hand-held reader 20 includes linear arrays of photodiodes which are scanned as the reader is moved over characters. (Such readers are commercially available.) As is typically the case, the output of the reader 20 is processed by a video processor to, for example, convert the analog signals received from the photodiodes into digital signals. Any one of a plurality of known video processors may be used for the processor 21. Video processors are described in U.S. Pat. Nos. 3,484,707 and 4,180,799.

In the presently preferred embodiment, two video channels identified as F1 and F2 are provided by the video processor 21 to the matrix extractor 22. The output of the matrix extractor comprises data derived from the video processor 21 which is then coupled to a recognition processor 23. The recognition processor 23 examines the data to identify characters. Numerous known techniques can be used to recognize characters from the data. See, for example, U.S. Pat. Nos. 4,180,799 and 4,075,065.

Figure 2:
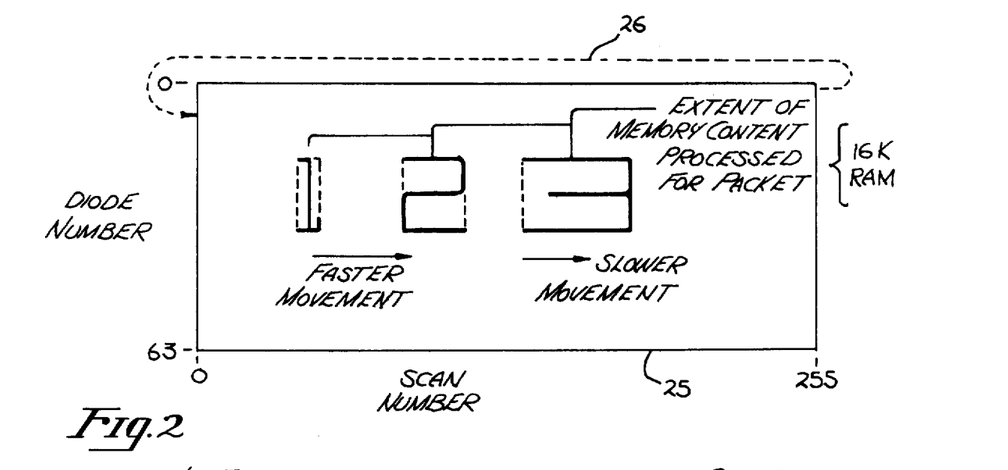
FIG. 2 is a diagram illustrating the numbers 1, 2 and 3 stored within a memory.

The matrix extractor includes a memory 25. (A possible content within the memory 25 for scanned images is illustrated in FIG. 2 for purposes of explanation). In the presently preferred embodiment, this memory consists of a 16K memory (16,348 bits). A commercial memory "chip", the 2118 is used, although other memories may be used. The memory is organized into 64 rows (0–63) and 256 columns (0–255). The scanned images from the reader 20 after processing by the video processor 21, are read into the memory 25 in a one-to-one mapping relationship, although other mapping relationship may be used. After data is written into column 255 of the memory, the next line of data is written into column 0 as indicated by line 26. Thus, the memory may be through of as a cylindrical, continuous memory. And, in fact, even when a single character is divided and stored at opposite ends of the memory (e.g., columns 250–255 and 0–10) the matrix extractor extracts data since it treats column 0 as following column 255.

The images of the numerals 1, 2 and 3 when stored in memory 25 are illustrated in FIG. 2. It is helpful for the recognition of these images if the stored data representing each image can be identified and removed. This, however, is not easily accomplished in the prior art for a number of reasons. First, the width of each image is not constant, more specifically the width is a function of the speed at which the reader is moved by the operator. For example, if the reader is moved at a faster rate, the images in memory are narrower, whereas if the reader is moved at a slower rate, the images in memory are wider. (Compare numbers 1 and 2 to number 3 in FIG. 2.) Secondly, the location of each image in the vertical direction in the memory is not known, and in fact the location of images may drift as the reader is moved. Nor is the horizontal location known. There may not exist an entire column of memory without data between each image. This is particularly true when two rows of information are simultaneously scanned, see for example in FIG. 5, the "greater than" and "less than" symbols shown on different rows. These are some of the problems encountered in isolating characters in memory.

The matrix extractor 22 of FIG. 1 isolates each packet as indicated by the dotted lines around each of the numbers 1, 2 and 3 in FIG. 2, as mentioned, and then extracts the data within each packet. Such data may then be more readily processed and characters recognized. The locations of each packet is also determined. This enables, for example, a determination as to which row a character belongs, and the sequence of the characters.

In general, the information from the reader is written into the memory at a rate controlled by the rate of the scanning. As presently implemented, for each one of these write cycles, the extractor follows behind the newly written columns, and reads the data at seven times the rate at which it is written. This reading, however, is performed both in the direction in which the new information is being written and also in the opposite direction (back-scanning) as will be described. The reading in the forward direction during the search mode identifies the beginning or birth of a packet, the packet's growth, decay, join, and drifts and finally the end or death of a packet. This is done primarily in association with the A register (an ordinary digital register identified by the letter "A"). Once the death of a packet has been detected, the horizontal right extent of the packet is known. Several packets may be in process in the A register at one time where more than a single row of characters are being scanned.

Following the death of a packet in the search mode, back-scanning occurs. The D register is used to store information during the back-scan mode on the vertical growth, decay and drift. When the end or death of a packet is detected, the horizontal left end of the packet is known. The E register is used to record the vertical extent of a packet during back-scan and thus provides the vertical top and bottom of the packet.

As will be described, during the extraction of a packet from memory, compression in the horizontal direction occurs such that each horizontal slice of each packet consists of a single byte.

Figure 3:
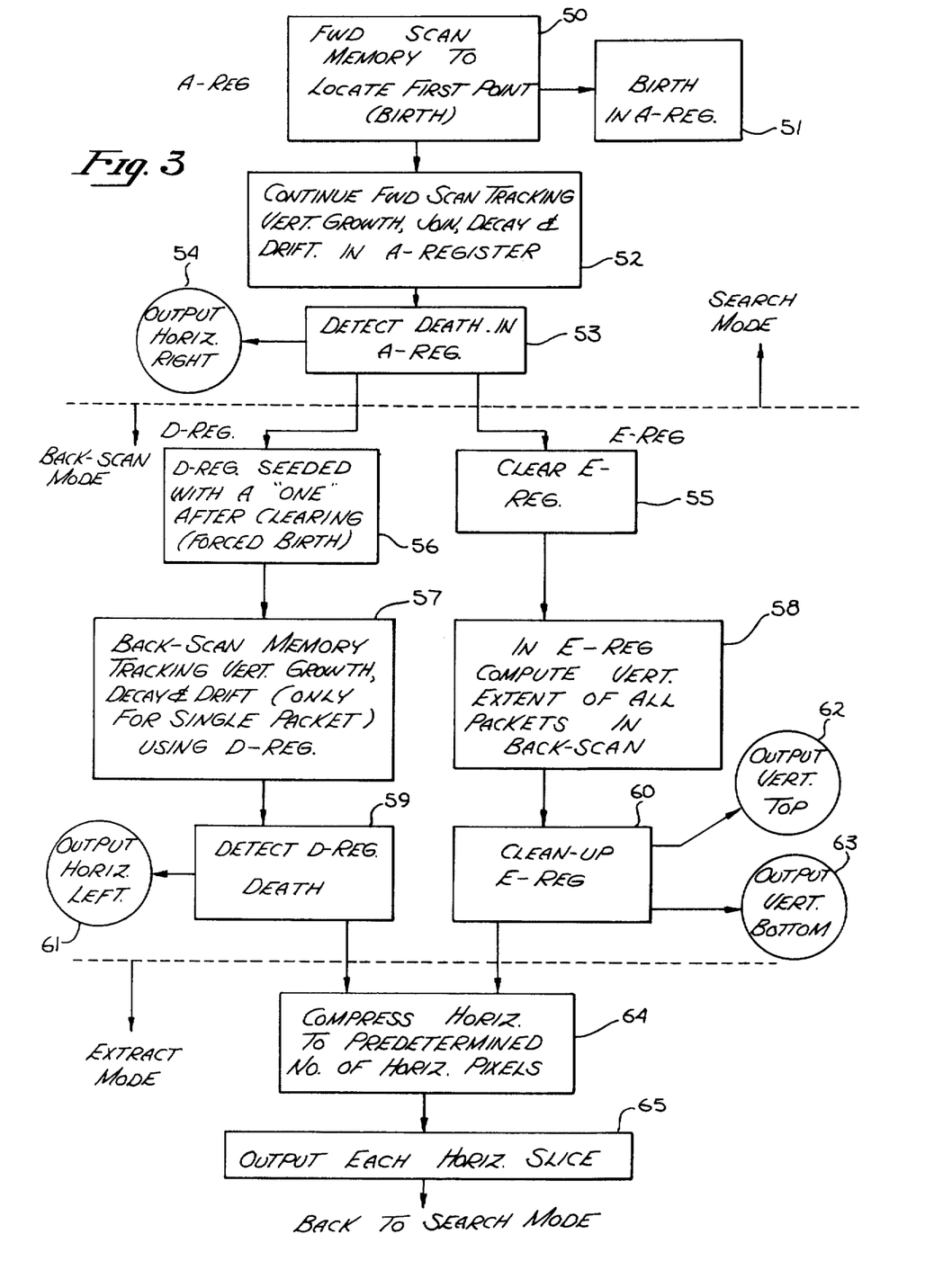
FIG. 3 is a series of blocks used to describe the method of the present invention.
Figure 4A:
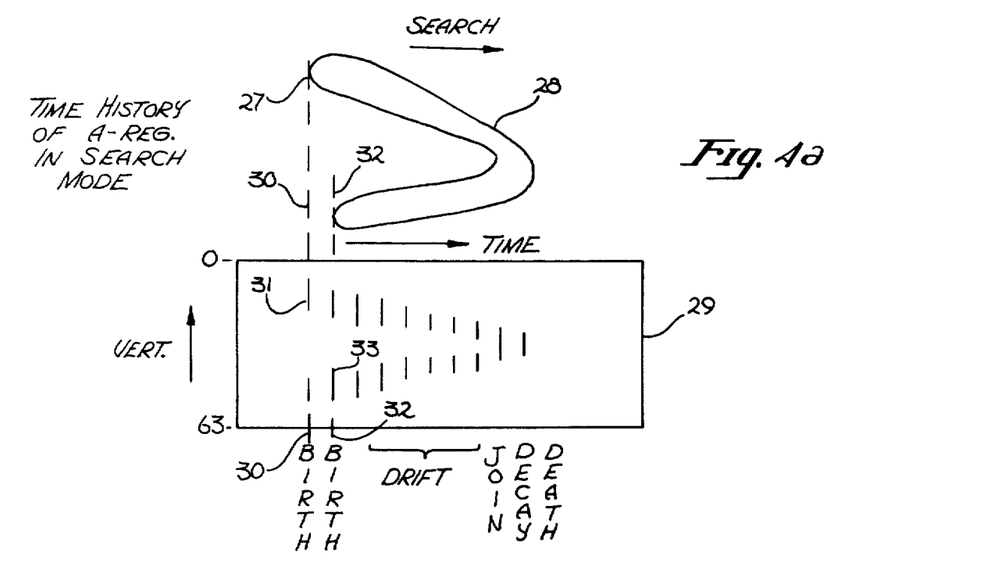
FIG. 4a illustrates the data stored in the "A" register of the invented extractor in the search mode for the "greater than" symbol.

Referring to FIG. 4a, assume that the image 28 ("greater than" symbol) is stored in the image memory 25. Further assume that during the search mode the memory is being scanned from left to right and that the data from the memory is being read and processed. During each scan, if data representing an image (contrasting pixel with respect to the background medium) is found in the image memory, a bit is stored in the A register at a location in the register corresponding to the vertical location in the image memory. (The A register is 64 bits wide.) Thus, for example, at a time 30 as shown in FIG. 4a, the edge 27 of the symbol 28 is detected and a binary one is written into the A register as indicated by line 31. This represents the birth of a packet. In FIG. 3, block 50 indicates this process, that is, the forward scanning of the memory to locate a first point and the storing of this data in the A register (block 51).

Figure 8:
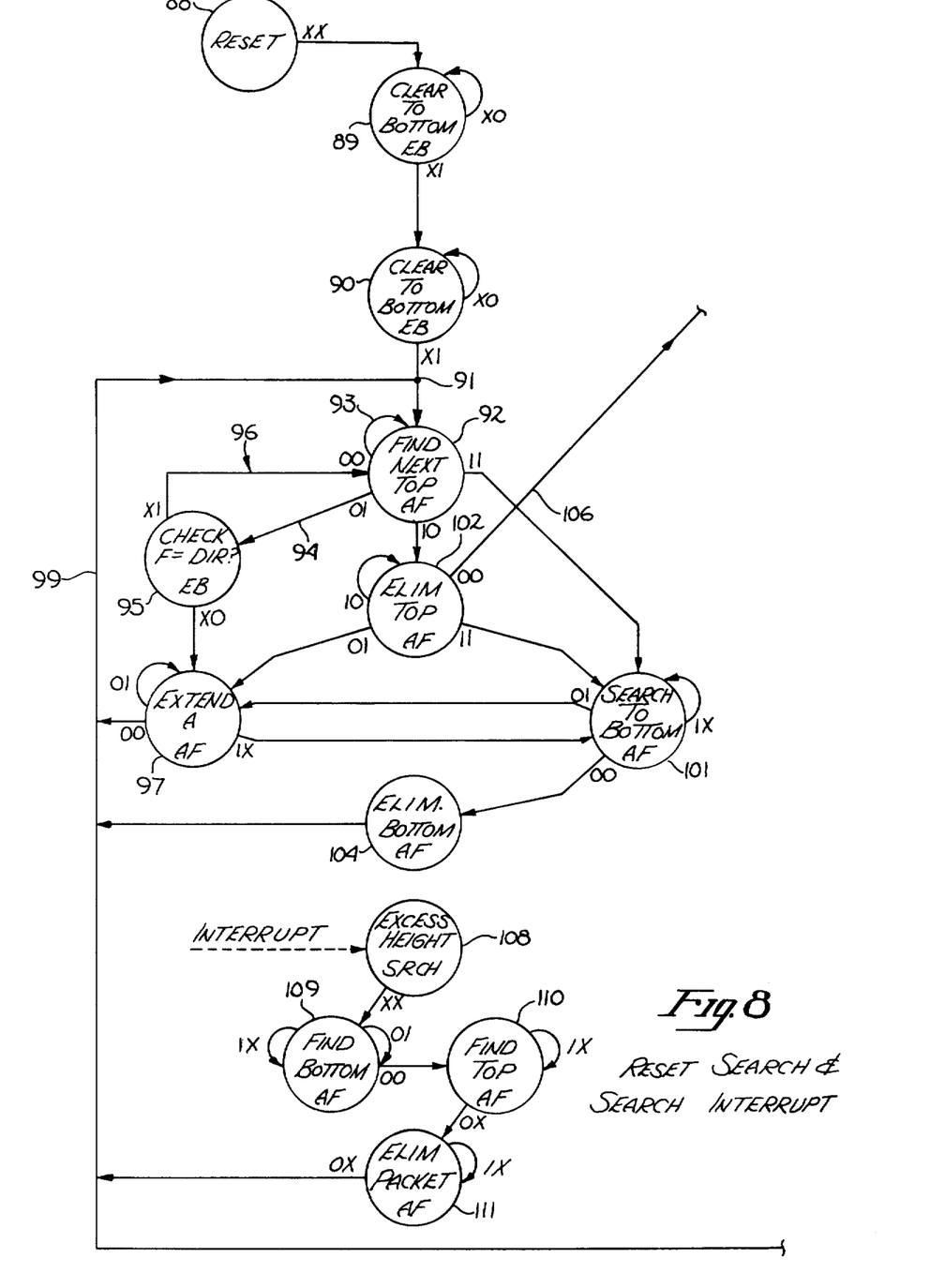
FIG. 8 is a portion of a state diagram illustrating the functions performed under the control of the controller of FIG. 6, primarily during the search mode.

During the next scan indicated by time 32, both the lower portion and upper portion of the symbol 28 are read from the memory and this information is stored in the register. The data represented by line 33 represents a second birth, and at this point in the process, it can not be determined if this a new packet, or part of the packet represented by line 31. The forward scanning continues and the data in the A register indicates a drifting of the image, a joining of the data lines, a decay of the image and finally, the end or death of the image. This is shown by blocks 52 and 53 of FIG. 3. At this point, the search modes ends and the horizontal right extent (as indicated by output 54) is known. (The specific logic used to detect the birth, growth, join, decay and drift is shown in FIG. 8 and will be discussed later in detail).

Figure 4B:
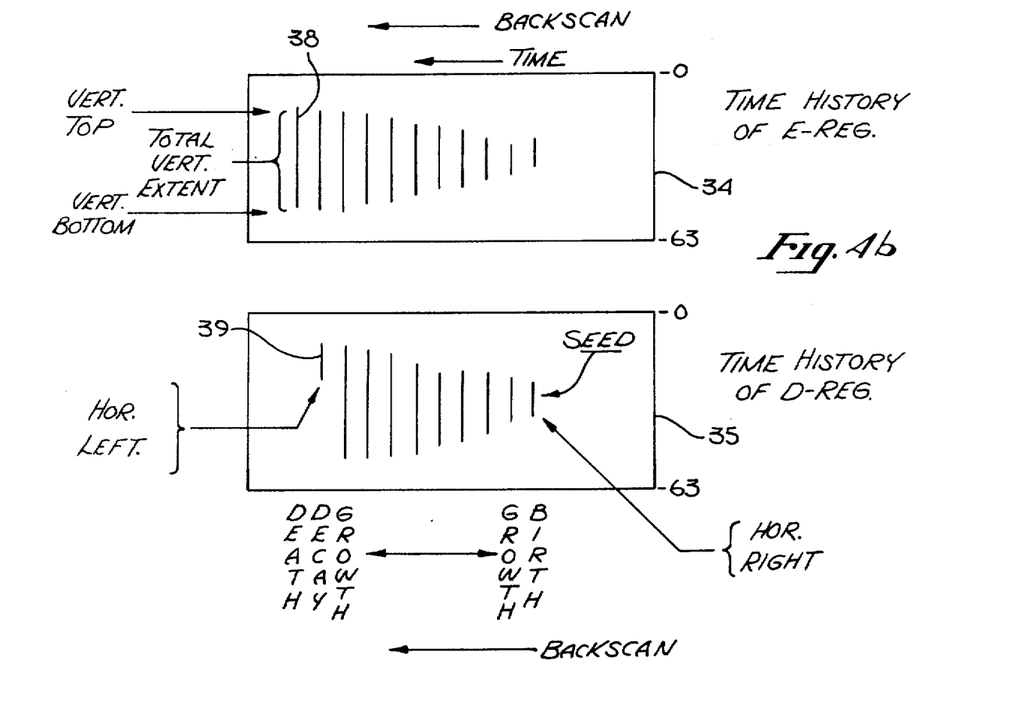
FIG. 4b illustrates the data stored in the "E" register and "D" register of the invented extractor during the back scan mode for the "greater than" symbol.

Next, the matrix extractor back-scans. The time histories of the data stored in the (i) E register (block 34) is shown in FIG. 4b, and (ii) the D register (block 35) is shown in FIG. 4c. Both these registers are 64 bits wide. Initially, (as will be described in greater detail) the D register is seeded with a binary one to represent a birth of a packet, and then this register tracks the growth and decay of the packet until the horizontal left position is determined as indicated in block 35. The content of the E register determines the total vertical extent, that is, the vertical top and vertical bottom of the packet.

Referring to FIG. 3, block 56 describes the seeding of the D register with a binary one after it has been cleared, while block 55 represents simply the clearing of the E register. Block 57 shows that during the back-scanning mode the vertical growth, decay, and drift is noted in the D register and as indicated by block 59 when a death is detected within the D register, the horizontal left (output 61) is known.

In the E register, the extent of all packets are noted (including those which may exist below or above the packet under consideration). Block 60 indicates that the E register is "cleaned up", that is, the data not corresponding to the packet under consideration is removed and then the packet top (output 62) and bottom (output 63) are known.

Following this, each slice (horizontal element) of the packet is compressed (normalized) to 8-bits (block 64) and then transferred (block 65) to the recognition processor 23 of FIG. 1 for recognition processing. The search mode then begins again.

Figure 5:
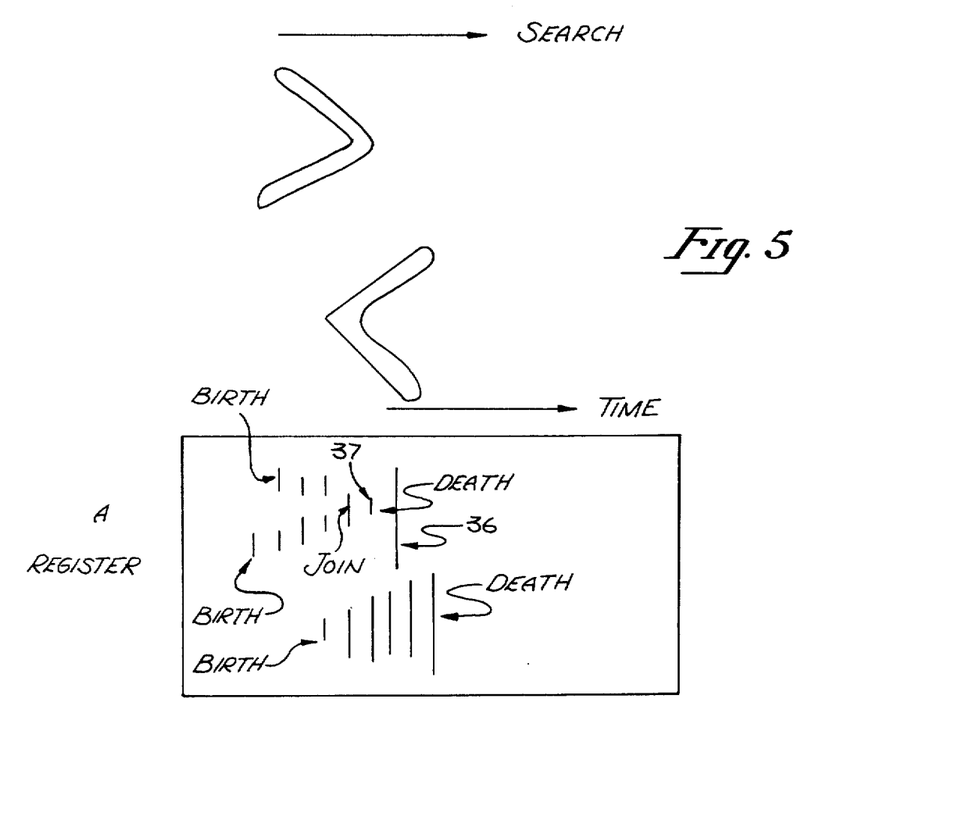
FIG. 5 is a diagram illustrating the data stored in the A register during the search mode when two characters in different rows are within the field of view of the reader.

Briefly referring to FIG. 5, during the search mode when two characters in different rows are scanned at the same time, the A register will accumulate data for both the upper and lower character. However, with the logic set forth in FIG. 8, the death of one packet will be detected even though another packet is represented in the A register. During back-scanning, the D register is seeded at time 36 with a binary one placed at the the vertical location of the data 37. The D register is implemented with the same logic as the A register except that a bit is only placed in the D register if there is data in memory during subsequent scans which is in connectivity with data stored in the register. Therefore, the D register only tracks the packet corresponding to the seed placed in the register. Since only connected points are tracked, the D register then records growth, decay, drift and death. (Compare blocks 29 and 35 of FIG. 4).

The E register also tracks the tops and bottoms of packets during the back-scan mode, but does so in a cumulative fashion as shown by block 34 of FIG. 4b. It is apparent that during the back-scan a number of continuous lines of data, such as line 38 of block 34 may be present in the register. For example, during the back-scanning of the characters of FIG. 5, a line similar to line 38 would be present in the E register caused by the "greater than" symbol, however, this line will not be connected to line 38 but in fact below it in the register. When the death of the packet is detected in the D register, all data is removed from the E register except the connected string of bits which include a location or locations corresponding to the data 39 of the D register. This is what is referred to as "cleaning up" the E register in block 60 of FIG. 3. When the E register is cleaned-up, it will only contain the maximum vertical extent of the packet for which the D register was seeded.

Thus, with the A, E and D registers a rectangle is defined about the packet corresponding to the smallest rectangle definable about the image stored in memory (see the dotted lines in FIG. 2 about the numbers 1, 2 and 3).

With the logic as shown in FIGS. 8-11 once one packet has been identified and extracted, the extractor returns to the search mode and the next packet death is sought. For the two rows of characters shown in FIG. 5, once the data for the "greater than" symbol is extracted, the death (in the A register) of the packet for the "less than" symbol is sensed. Then back-scanning occurs to fully identify the extent of the data packet representing the "less than" symbol so that this data may be extracted from memory for processing.

Figure 6:
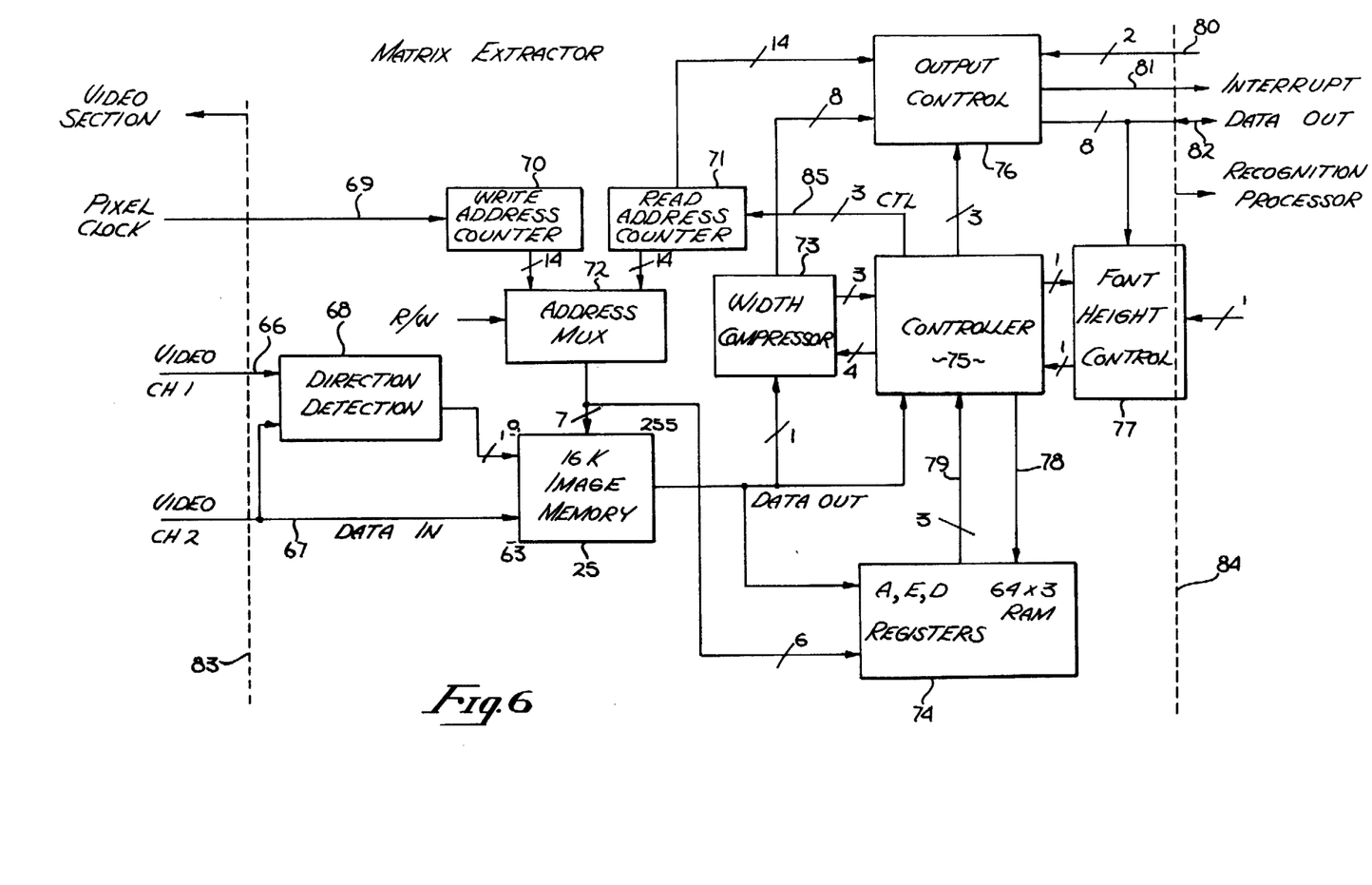
FIG. 6 is a block diagram of the presently preferred embodiment of the invented matrix extractor.

Referring now to FIG. 6, the matrix extractor of the present invention along with several other circuits not directly required for the matrix extractor such as the direction detection means 68 and the width compressor 73 are shown between dotted lines 83 and 84. The video signals are received from the video section and in the presently preferred embodiment, two channels of video signals on lines 66 and 67 are coupled to the extractor. Also, a clocking signal from the scanner is coupled to the write address counter 70 on line 69. The lines to the recognition processor are shown to the right of dotted line 84.

In its presently preferred embodiment, the output of the video processor provides two channels of video information which contain data received from spaced-apart linear arrays. (See U.S. Pat. No. 4,180,799.) Only one channel of data is necessary for character recognition if the reading is always moved in a single direction over the characters. However, since the reading may be performed both from right-to-left and left-to-right it is necessary for the recognition processor to know the direction of the movement. For example, this direction information is necessary to discern between a "greater than" or "less than" symbol. The direction detection means 68 which may be any one of a number of known direction detection circuits, detects the direction of the reader movement and a signal representing the direction is stored within the image memory 25 in locations not used for images, as will be described. This direction signal during extraction of data from memory 25, is coupled through the width compressor 73 and output control means 76 to the recognition processor.

As the memory 25 is currently implemented, it is assumed that valid data or packets which are to be extracted for recognition, will be stored at any column location, but between rows 4 through 59. White guard bands are forced at rows 0-3 and row 60 for all columns, column locations 0-254 of row 61, and at row 62 for all columns. These white guard bands assure that there will be a discontinuity during processing of partial packets appearing on the upper and lower edges of the field of view. This allows the processing to occur in a more continuous manner and eliminates special logic states to prevent top and bottom partial packets from being joined. A bit representing a pseudo-packet is placed at column 255, row 61 to inform the recognition processor when the memory is about "wrap-around". (See line 26 of FIG. 2.) The direction data from the direction detection means 68 is stored at row 63.

The write address counter 70 comprises an ordinary digital counter which automatically resets when reaching a count of 16,384. This counter operates in synchronization with the scanner and receives a pixel clocking signal on line 69. Thus, for the described memory there is a one-to-one mapping of the scanned images into the image memory 25. The read address counter 71 is again a 16K counter which counts under the control of controller 75. Lines 85 provide control signals to the counter 71 which are decoded to cause the counter to respond to six commands in addition to a reset and a "no count" signal. Controller 75 can cause the count in counter 71 to read vertically up one space in the memory, vertically down, horizontal left, horizontal right and two raster scanning modes. One scanning mode is a raster scan while scanning upward and moving to the left (counter, down counts) and the other is a downward raster scan to the right (counter, up counts). It is of course the read address counter 71 which is clocked during the search mode, back-scan mode and during data extraction. The address in the counter 71 is coupled to the output control means 76 and is communicated to the processor to provide the packet location data.

The outputs of both the counters 70 and 71 are coupled through the address multiplexer 72 to the image memory 25. The multiplexer receives a read/write signal to select between the outputs of these two counters. As previously mentioned, in the presently preferred embodiment, there are seven read cycles for each write cycle. (Not shown is a circuit which prevents the reading of the memory to overtake the writing.)

The registers 74 comprise a 64×3 RAM allowing each of the A, E and D registers to have the necessary 64 bits storage capacity. These registers receive 5 control signals (lines 78) which are decoded to provide the following controls for each register. In the case of the A register, there are three controls, (1) write back the previous value into A, (2) write back a zero value, and (3) write back a one value into the A register. There are four commands to the E register as follows; (1) write back the old value of the E register, (2) write back the value of the E register ORed with the image data from memory 25, (3) write back a zero, and (4) write back a one. There are two commands for the D register; (1) write back a zero, and (2) write back a one. There are three lines 79 from the registers to the controller 75 which allow the sensing of data in each of the registers A, E, and D as these registers are addressed by six address bits from the address multiplexer 72.

The output control means 76 includes a multiplexer which permits selection between the address bits from the read address counter 71 or data bits from the width compressor 73. Control means 76 includes a first-in, first-out (FIFO) register or buffer which is 64×8 bits wide. Both data and the coordinates of the data are coupled to the processor on the 8 lines 82. The three control lines from the controller 75 to the output control means 76 provide the following controls: (1) load the first-in, first-out register and (2) provide for message formatting for the vertical and horizontal components and the data bytes. As mentioned, the coordinate data is necessary for contouring, that is, to distinguish between characters on different rows, generally referred to as field isolation. The two control lines 80 from the recognition processor to the output control means 76 are used to request outputs and to check status. Line 81 provides an interrupt signal.

For any particular font which is being read, the height of the characters is known. The font height control means 77 prevents data from being read into the first-in, first-out register for packets which are isolated with a height of more than a predetermined height. This, for example, prevents the reading out of packets representing borders, and the like. The font height control means consists of an 8-bit latch and a counter. An 8-bit word is loaded into the latch from the recognition processor. Then on commands from the controller, as a packet is being extracted from the image memory, the counter counts down from the number stored in the latch. If a zero count is reached before the packet is extracted, it is known that the packet is greater than the predetermined font height and the controller 75 prevents the packet from being output to the first-in, first-out register of the output control means 76, and the data is discarded. The one control signal from the controllers to the height control means 77 loads and clocks the counter and the one control lines from the control means 77 to the controller 75 indicates when a zero count has been reached.

As illustrated best in FIG. 1, the width of an image in memory can vary as a function of the speed at which the reader is moved across the printed matter. It is easier to compress each horizontal slice of each packet into a predetermined number of bits, for example, 8-bits before coupling the data to the recognition processor. A plurality of known circuits are available for compressing long binary words into shorter "normalized" binary words.

Figure 7:
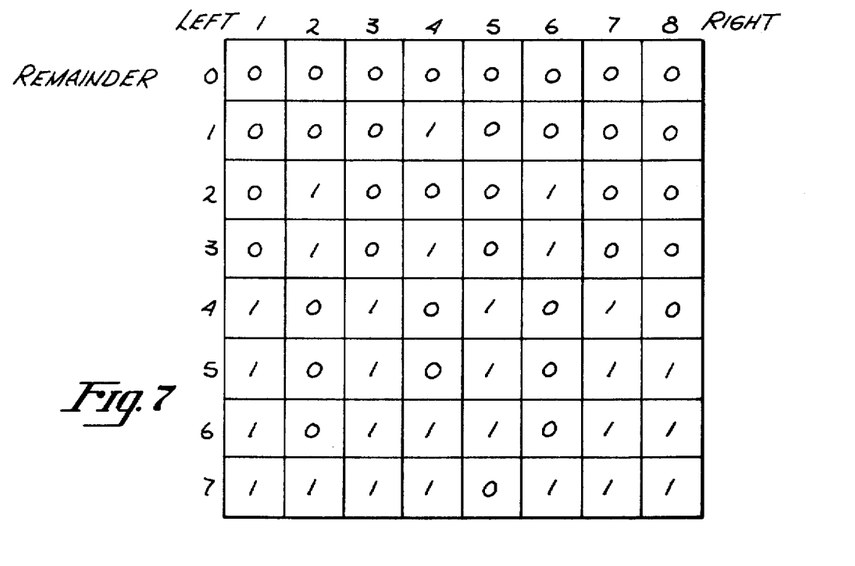
FIG. 7 is a table illustrating the distribution of "remainders" used by the width compressor of FIG. 6.

The width compressor 73 in addition to compressing data is used to reject packets with widths greater than 128 lines. A counter checks this width and provides an overflow signal (0) when this width is exceeded. Such long packets indicate, for example, that the hand-held reader is being moved too slowly, or that non-OCR packets are being scanned. (Note that the width of a given packet is constant since a rectangle is defined about the packet as shown in FIG. 1.) The width compressor senses, by counting, the width of any particular packet. This width is divided by 8, since 8-bits of output are used in the presently preferred embodiment. Obviously, when dividing any integer by 8, a remainder can occur which varies between 0 and 7. The remainder scans are distributed as shown in FIG. 7.

Assume for sake of discussion, that a packet is 92 scans wide in the horizontal direction. Dividing 8 into 92 leaves 11 with a remainder of 4. In the table of FIG. 7, with a remainder of 4, the remainder is distributed with an extra bit placed in the first, third, fifth and seventh bit portions. Thus, upon reading, a 92-bit wide slice, the first 12 bits are sensed and ORed and then used to provide the first output bit for that slice. The next 11 bits are then ORed to provide a second output bit. The next 12 bits are ORed to provide the third output bit of the output byte, and so on. Note that with this ORing process, if there is a single stored binary one in the image memory for the ORed word, the output word will be a binary one.

The control bits to the compressor from the controller 75 indicate an overflow (too wide a packet), end of a character and, end of the "eighth" of a packet slice. The four control lines from the controller 75 to the compressor are used to control the scan counter and provide reset, no count, up count and down count signals for the compressor.

The width compressor 73 as described above, is not necessary for the invention of the present application and as mentioned, other compressors may be used.

FIGS. 8-11 contain state diagrams (flow diagrams) for the logic and control implemented by the controller 75 of FIG. 6. These diagrams may be readily implemented as logic circuits or in the form of a read-only memory program as used in the presently preferred embodiment. It is the logic and control of FIGS. 8-11 which implements the method steps of FIG. 3 in the apparatus of FIG. 6.

Figure 12A:
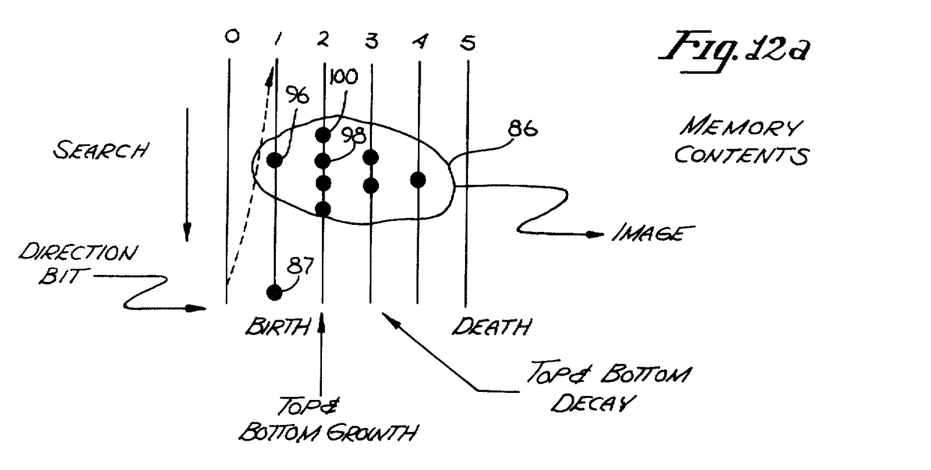
FIG. 12a illustrates the contents of the image memory for a character.

Referring now to FIG. 12a, assume that the image within line 86 is stored in memory and additionally, a direction bit 87 is stored at row 63. Further assume that the matrix extractor is in the search mode and is searching for a packet. The data is non-destructively read from the image memory. In general, during the search mode, when an image bit "F" is detected in memory, a read-modified-write cycle occurs for the A register. The same is true for the E and D registers during the back-scan mode.

Figure 12B:
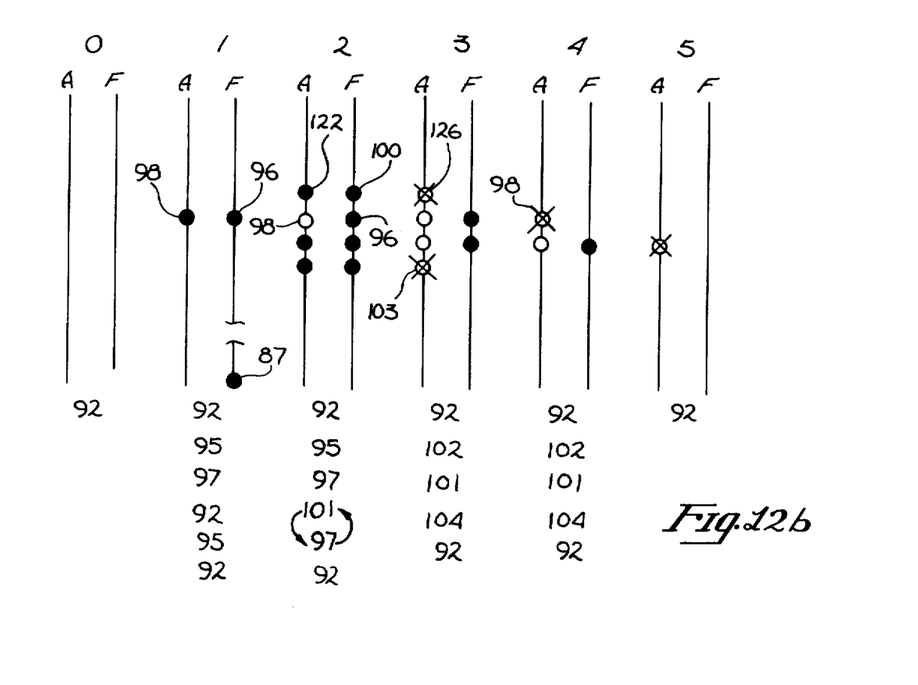
FIG. 12b illustrates the content of the A register during the search mode for the character of FIG. 12.

In FIG. 12b, the contents of the A register (A columns) and the contents of the image memory (F columns) are shown for six scans, 0, 1, 2, 3, 4, and 5 which correspond to the scanning of columns 0–5 of the image memory. The data shown on the columns F of FIG. 12b correspond to the image shown in FIG. 12a. (Note in FIG. 12b solid data or bits represent newly written data in the register, circles represent previously written data, and circles with "x" represent eliminated data.)

Referring now to FIG. 8, the states 88, 89 and 90 show preliminary logic used to clear registers, for example, when the system is first turned on. At node 91, the search mode begins.

State 92 functions to "find next top" of a packet. That is, each bit (F) read from the image memory is compared with the contents of the A register (A). This is a one to one comparison. For example, if a bit is read from any column, at row 30, it is compared with the bit stored in the 30th position of the A register. During the search mode, a raster scan is used as shown in FIG. 12a with scanning of the memory occurring down one column and then down the next column moving to the right.

Assuming that the A register is clear and scanning of the memory occurs down column O of FIG. 12a. Referring to state 92 of FIG. 8, A=0 and F=0 and, as indicated by line 93 (00) nothing occurs, that is, the logic state remains within the state 92.

When the scanning continues down column 1 of FIG. 12a, A=0 and F=0. State 92 remains until the first data point from the memory is reached. When the bit 96 is reached, A=0 and F=1. This causes a flow to state 95 along line 94. The bit read from memory is not a direction bit (since it is not stored in row 63) and the statement XO is satisfied. This causes the flow to state 97. The logic implemented in state 97 is to write into the A register ("Extend A") and thus bit 98 is written into the A register. As scanning continues down column 1, A=0 and F=0, thus returning to state 92, via line 99. The flow for this portion of column 1 is indicated below column 1 in FIG. 12b, that is, states 92, 95, 97 and 92.

When the direction bit 87 is reached, A=0 and F=1; the comparison 01 causes a change (line 94) to state 95. State 95 indicates that the bit is checked to determine if it is a direction bit. Since the contents of F is a direction bit, (this is known since it is in row 63) B=1 and E=0 since the E register has been cleared. The statement X1 is satisfied. (The E register can have any value, but if B=1, a return to state 92 occurs as indicated by line 96). In FIG. 12b, below column 1, the numbers 95 and 92 also appear to indicate the state flow for the reading of column 1.

For column 2, when bit 100 is read, A=0 and F=1 and the logic proceeds to state 95 and then on to state 97 and bit 122 is written into the A register. When the next bits 96 and 98 are compared, A and F equal 1 and the condition 1X is satisfied, thus causing a flow to state 101 ("search to bottom"). When the next bits are compared, A=0 and F=1. This causes a return to state 97 and another bit is written into the A register and then there is a return to state 101, and back to state 97 as the last bit shown in column 2 is written into the register. Next a return to state 92 occurs since A=0 and F=0.

When column 3 is read and bit 122 is reached in the A register, there is no corresponding data from the image memory (F) since the image top is decaying. Thus, A=1 and F=0, causing a flow to state 102. The logic implemented by this state eliminates the top bit (Elim. Top) of the A register, that is, erase bit 122. Then during the following three cycles A=1, thus the condition 1X is satisfied and the control remains in state 101. When bit 103 is reached, A=1 and F=1, and there is no movement from state 101. However, on the next read cycle, when A=0 and F=0, there is a change to state 104, and this state causes bit 103 to be erased from the A register (eliminate bottom by backing up). Within state 104, scanning continues in the vertical up direction to eliminate the entire bottom, that is, until F=1. When F=1, there is a return to state 92.

Under the fourth column of FIG. 12b, when the data bit 98 is reached in the A register there is a transfer to state 102 and data bit 98 is removed from the register. With A=1 and F=1, there is a transfer to state 101, then a transfer to state 104 and immediately a transfer back to state 92 since there is no bottom to remove.

In the final column 5 when A=1 and F=0, there is a transfer to state 102 and a removal of the last data point in the A register. There is then a 0 condition of A=0, F=0 indicating the death of a packet, the end of the search mode and a transfer to the back-scan and mode of FIG. 9 (line 106).

While not critical to the present invention, in states 108, 109, 110 and 111, and beginning for the above example, when the A register is first extended (state 97) the height of the packet is examined and in the presently preferred embodiment, if the packet is above a predetermined height, the packet is eliminated as previously mentioned.

The logic implemented in FIG. 8 for the packet of FIG. 12a detected a packet birth, growth, decay and death. The same logic also detects a joining. If two or more packets are simultaneously processed within the A register (e.g., characters in different rows) the logic of FIG. 8 will nonetheless detect the death of one packet and after the extraction of the data for that packet, will detect the death on another packet after a return to the search mode.

During the performance of the above logic (as well for the logic set forth below) new data from the reader is written into the image memory 25. As mentioned for each 7 read cycles used during the search mode, back-scan mode, etec., one new column of image data is placed in memory. By the time new data is written over the old data, the old data has been processed by the logic set forth in FIGS. 8-11.

Figure 9:
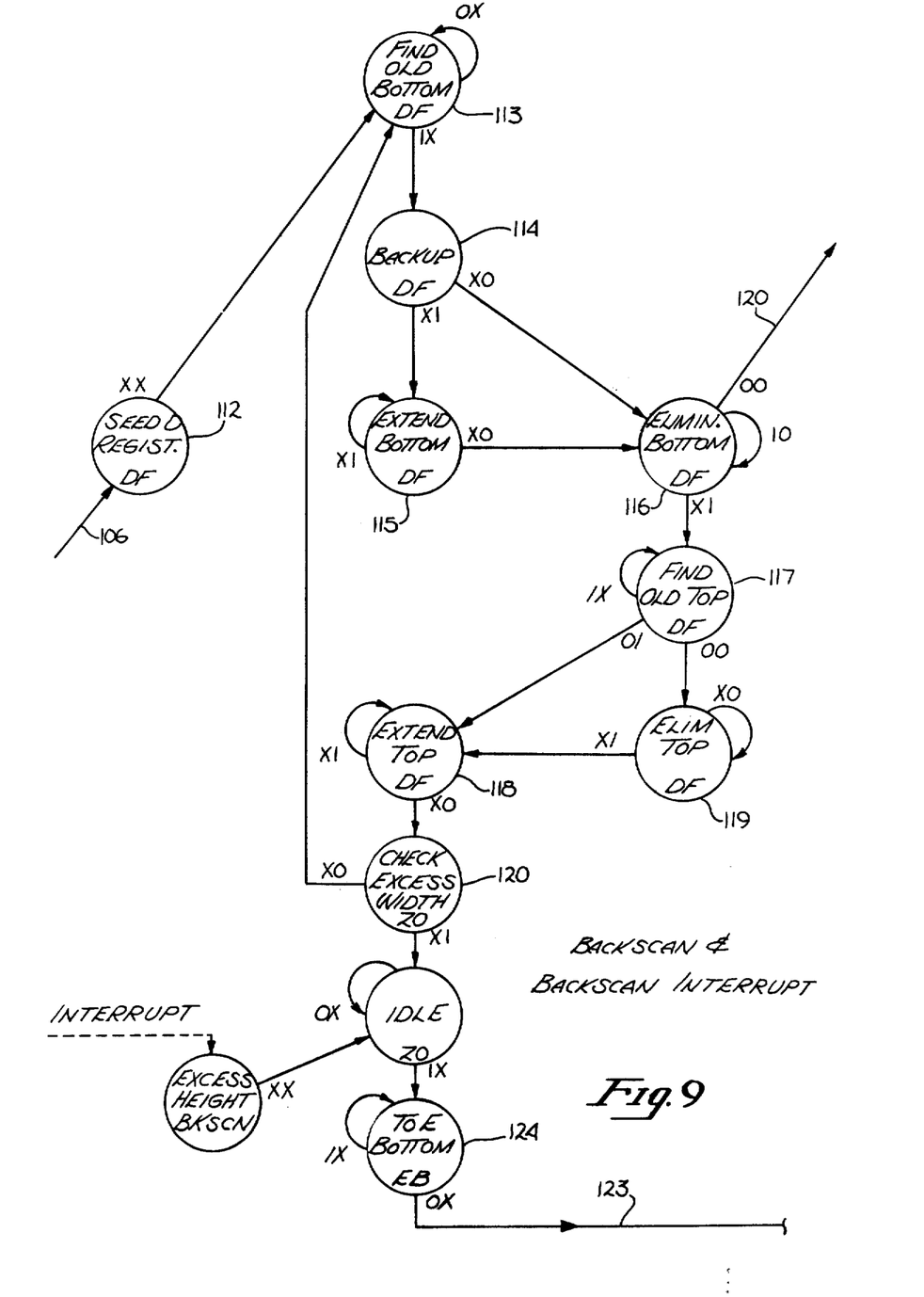
FIG. 9 is a continuation of the state diagram of FIG. 8, illustrating primarily the back-scan mode function.

Referring now to FIG. 9, in the back-scan mode as indicated by state 112, the D register is seeded as previously discussed. Then in state 113, the previous bottom of the packet is found during the back-scan as indicated by state 113, note here the scan is moving in the upward direction. Again, the contents of the D register are compared with the data from memory "DF". When the first bit in memory is reached, (moving upward on column 4 of FIG. 12b) it will of course coincide with the seed and then there is a transfer to state 114. (Note the backup command of state 114 reflects a downward movement of the scan.) Now branching occurs, depending on the results of the comparison DF, to either state 115 or 116. In these states, the bottom of the packet is processed, causing the contents in the D register to either extend, or be eliminated. When the bottom is eliminated (D and F=0) there is transfer on line 20 to state 121 of FIG. 10 (end of back-scan mode).

The state 117 of FIG. 9 is similar to state 113 and locates the top of the packet with states 118 and 119 extending or eliminating bits from the D register to process the top of the packet.

During the back-scan mode whenever bits are written into the D register or read from the image memory, a bit is written in the E register. After the back-scan mode as will be described, this register is "cleaned-up".

During the back-scan mode, the width of the character is checked by the state shown below state 120. The "Z" of state 120 indicates the "end of character" signal from the compressor and the "0" designates an overflow from the counter in the width compressor 73. The "EB" of the state 124 is again a check to determine if a direction bit is being sensed, similar to the check made by state 95 of FIG. 8. The line 123 from state 124 is connected to state 125 of FIG. 11. If excess width is detected, there is a transfer to state 124 and an interrupt occurs, discarding the data. Note an interrupt may occur for either excess height or excess width.

Figure 10:
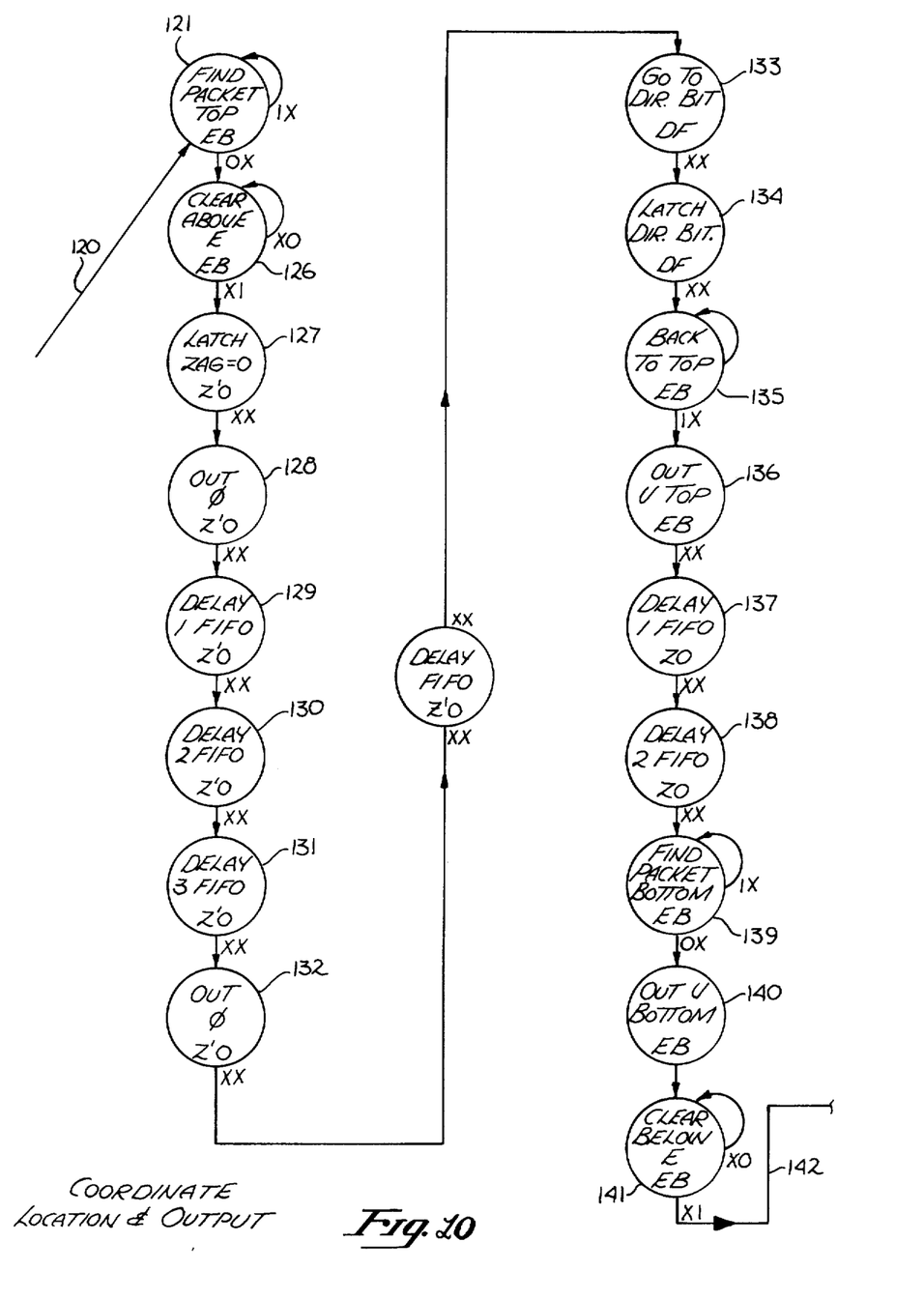
FIG. 10 is a continuation of the state diagram of FIG. 9 illustrating primarily the functions involved with the output of the coordinate locations for an identified packet.
Figure 11:
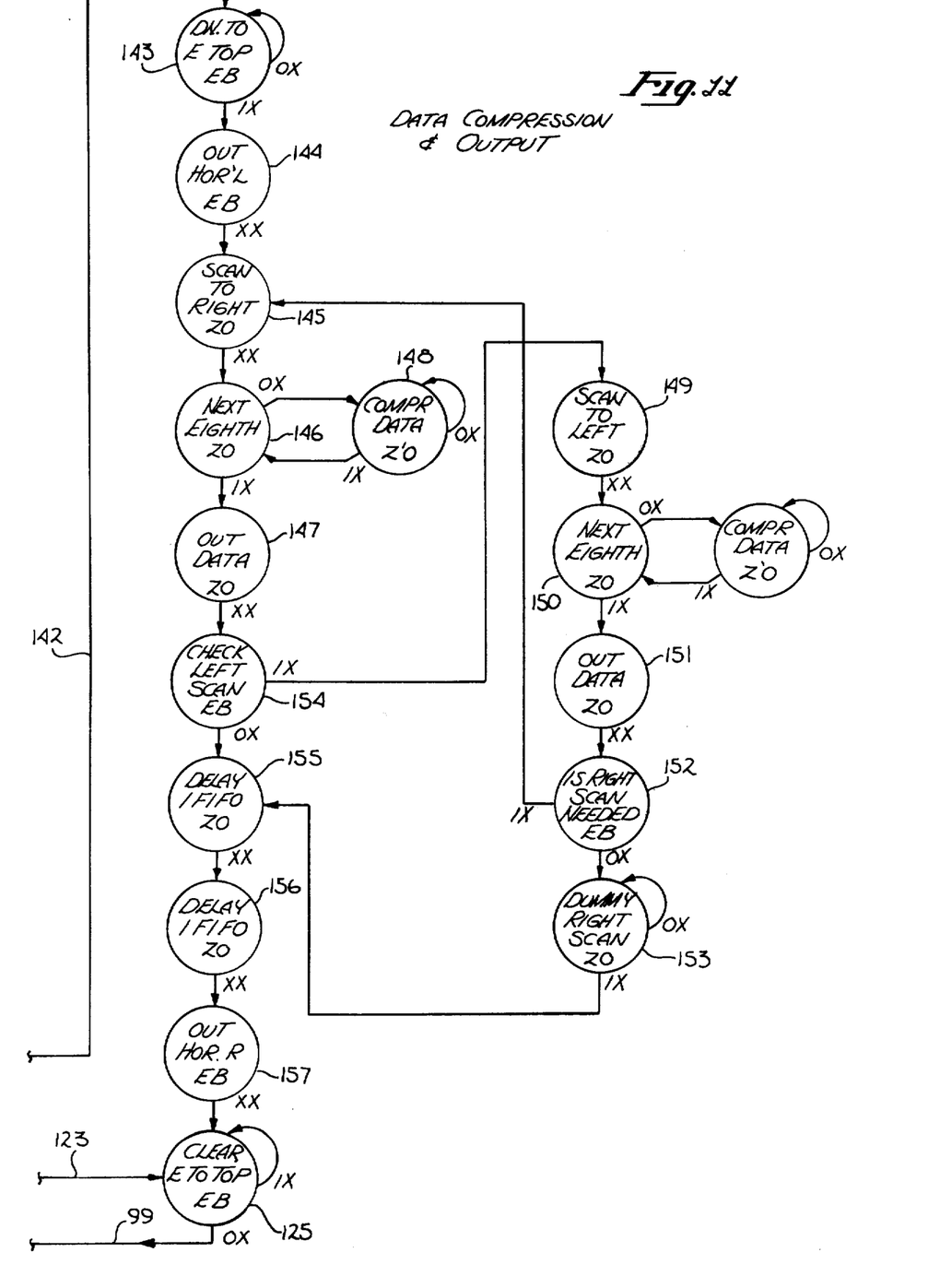
FIG. 11 is a continuation of the state diagram of FIG. 10 and illustrates the functions performed during data compression and data extraction.

Upon completion of the back-scan, that is, when the "00" condition of state 116 is satisfied, there is a transfer along line 120 to state 121 of FIG. 10. The states 121 and 126 "clean-up" the E register, that is, all bits in the E register that are not contiguous with the last bit in the D register are removed.

States 127, 128, 129 and 130 and 131 provide the output of a first synchronization character, while state 132 provides a second synchronization character. The "Z¹" and 0 of these states indicates the comparison of the end of each eighth of a character slice from the compressor (Z¹) and again the overflow from the compressor (0). The "FIFO" refers to the first-in, first-out register previously discussed as part of the output control means 76 of FIG. 6.

In the states 133, 134, 135, 136, 137 and 138, the direction bit is fetched and provided as an output along with the vertical top location of the packet. (6 bits for vertical top and 1 bit for direction bit.) Following this, in states 139 and 140, the vertical bottom coordinate is provided as an output. State 141 is preparatory to the extraction of data from the memory and the line 142 connects state 141 with state 143 of FIG. 11. State 143 is also for preparation of the extraction of data from the memory. In state 144, the horizontal left output coordinate of the packet is provided.

States 145, 146, 147 and 148 control the output of data from the memory, and specifically control a right scan, compression of data and output of a data byte through the width compressor 73 and output control means 76 of FIG. 6. The states 149, 150, 151, and 152 control a left scan of the memory and similarly a compression of the data and then an output of a data byte. The states 152 and 153 are checks to assure that a scan to the right has in fact been made. Similarly, state 154 provides a check on the scan to the left.

States 155, 156 and 157 provide an output which comprises the horizontal right coordinate of the packet. The final state 125 is a post extraction "clean-up" and in effect clears the E register. There is then a return on line 99 to begin the search mode again at state 92 of FIG. 8.

Thus, by implementing the above states, the various steps shown in FIG. 3 are accomplished by the extractor of FIG. 6. That is, packets are isolated, the packet location determined, and the data extracted from the memory.

A matrix extractor has thus been described which is particularly useful for use in optical character recognition processing. The described method and apparatus isolates packets of data in memory which packets are likely to contain characters, or the like. By isolating these characters, there is less need to process the entire memory. Importantly, the above-described method and apparatus permits the simultaneous scanning and processing of two separate rows of characters.

We claim:

1. In the processing of scanned images for character recognition, a method for isolating areas of the scanned medium for recognition processing comprising the steps of:
storing representations of said scanned images in a memory;
scanning said memory in a first direction so as to detect the end of a packet of data in said memory;
sensing the location of said end of said packet in said memory;
back-scanning said memory through said packet in a second direction, opposite to said first direction so as to detect the end of said packet in said second direction;
recording the extent of said packet in memory in the direction perpendicular to said first and second directions during said back-scanning;
sensing the location of the end of said packet in said second direction;
whereby data in memory is isolated which can be removed to recognition processing.

2. In an optical character recognition system an improvement comprising:
a memory for storing scanned data;
a first, second and third register;
first control means for scanning said memory in a first direction and for writing and removing data from said first register, so as to enable the detection of the beginning and end of a packet of data in said memory in said first direction, said first control means coupled to said memory and said first register;
second control means for scanning said memory in a second direction, opposite to said first direction and for writing and removing data from said second and third registers, so as to enable detection of the end of said packet of data in said second direction and the extent of said packet of data in the direction perpendicular to said second direction, said second control means coupled to said memory and said second and third registers;
whereby data in said memory is isolated for recognition processing.

3. The improvement defined by claim 2 wherein said first control means tracks the tops and bottoms of packets of data in said first register and detects vertical growth, join, decay and drift of data packets within said first register.

4. The improvement defined by claim 2 wherein said second control means writes a signal into said second register corresponding to the detection of the end of said packet in said first direction within said first register.

5. The improvement defined by claim 4 wherein said second control means tracks the tops and bottoms of said packet of data in said second register and detects vertical growth, decay and drift for said packet of data contiguous with said signal written into said second register.

6. The improvement defined by claim 2 wherein said second control means tracks the vertical extent of all packets of data within said third register and upon said detection of said end of said packet of data in said second direction removes all data from said third register not corresponding to said packet of data.

7. The improvement defined by claim 2 including data extraction means coupled to said memory and registers for defining a perimeter about said packet of data and for removing data from said memory from within said perimeter.

8. The improvement defined by claim 7 wherein said perimeter is a rectangle.

9. The improvement defined by claim 8 wherein the extent of said rectangle in said first direction is determined from the detection of said end of said packet of data from said first register.

10. The improvement defined by claim 8 wherein the extent of said rectangle in said second direction is determined from said second register.

11. The improvement defined by claim 10 wherein the extent of said packet of data in a direction perpendicular to said first and second direction is determined from said third register.

12. The improvement defined by claim 11 wherein data defining said rectangle is formatted for a recognition processor.

13. The improvement defined by claim 7 including data comprising means for normalizing data in said first and second direction as said data is extracted for each of said packets of data.

14. The improvement defined by claim 13 wherein for said normalization each slice of data for each of said packets of data is compressed into a fixed number of words.

15. The improvement defined by claim 2 wherein said memory is also used to store data representing the direction in which data is read.

* * * * *